United States Patent
Shalen

(10) Patent No.: US 8,694,407 B2
(45) Date of Patent: Apr. 8, 2014

(54) METHOD AND SYSTEM FOR CREATING A VOLATILITY BENCHMARK INDEX

(75) Inventor: Catherine T. Shalen, Chicago, IL (US)

(73) Assignee: Chicago Board Options Exchange, Incorporated, Chicago, IL (US)

(*) Notice: Subject to any disclaimer, the term of this patent is extended or adjusted under 35 U.S.C. 154(b) by 2 days.

(21) Appl. No.: 13/553,341

(22) Filed: Jul. 19, 2012

(65) Prior Publication Data

US 2013/0097064 A1 Apr. 18, 2013

Related U.S. Application Data

(63) Continuation of application No. 12/267,013, filed on Nov. 7, 2008, now Pat. No. 8,249,972.

(60) Provisional application No. 60/986,718, filed on Nov. 9, 2007.

(51) Int. Cl.
*G06Q 40/00* (2012.01)
*G06Q 40/04* (2012.01)

(52) U.S. Cl.
CPC ..................................... *G06Q 40/04* (2013.01)
USPC ........................................................ 705/36 R

(58) Field of Classification Search
CPC ............................... G06Q 40/04; G06Q 40/06
USPC .......................................................... 705/36 R
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,903,201 A | 2/1990 | Wagner | |
| 4,980,826 A | 12/1990 | Wagner | |
| 5,038,284 A | 8/1991 | Kramer | |
| 5,101,353 A | 3/1992 | Lupien et al. | |
| 5,136,501 A | 8/1992 | Silverman et al. | |
| 5,297,031 A | 3/1994 | Gutterman et al. | |
| 5,297,032 A | 3/1994 | Trojan et al. | |
| 5,305,200 A | 4/1994 | Hartheimer et al. | |
| 5,315,634 A | 5/1994 | Tanaka et al. | |

(Continued)

FOREIGN PATENT DOCUMENTS

EP 0 752 135 2/1999
EP 0 952 536 A1 10/1999

(Continued)

OTHER PUBLICATIONS

SEC Notice, Release No. 34-51107, SR-CBOE-2004-75, Federal Register vol. 70, No. 23, dated Friday, Feb. 4, 2005, pp. 6051-6057.

(Continued)

*Primary Examiner* — Jessica Lemieux
(74) *Attorney, Agent, or Firm* — Brinks Gilson & Lione

(57) ABSTRACT

A method and system for creating a volatility benchmark index is disclosed. The method includes obtaining a value of a Treasury bill account less a mark-to-market value of at least one of a volatility-based future or option and calculating a value reflecting a volatility benchmark. The value may be displayed at a trading facility and volatility benchmark quotes may be transmitted by the trading facility to a market participant.

6 Claims, 4 Drawing Sheets

(56) References Cited

U.S. PATENT DOCUMENTS

| | | |
|---|---|---|
| 5,557,517 A | 9/1996 | Daughterty, III |
| 5,664,115 A | 9/1997 | Fraser |
| 5,689,652 A | 11/1997 | Lupien et al. |
| 5,715,402 A | 2/1998 | Popolo |
| 5,744,877 A | 4/1998 | Owens |
| 5,774,877 A | 6/1998 | Patterson, Jr. et al. |
| 5,787,402 A | 7/1998 | Potter et al. |
| 5,793,301 A | 8/1998 | Patterson, Jr. et al. |
| 5,797,002 A | 8/1998 | Patterson, Jr. et al. |
| 5,809,483 A | 9/1998 | Broka et al. |
| 5,813,009 A | 9/1998 | Johnson et al. |
| 5,819,237 A | 10/1998 | Garman |
| 5,845,266 A | 12/1998 | Lupien et al. |
| 5,873,071 A | 2/1999 | Ferstenberg et al. |
| 5,905,974 A | 5/1999 | Fraser et al. |
| 5,913,202 A | 6/1999 | Motoyama |
| 5,915,209 A | 6/1999 | Lawrence |
| 5,915,245 A | 6/1999 | Patterson, Jr. et al. |
| 5,924,082 A | 7/1999 | Silverman et al. |
| 5,950,176 A | 9/1999 | Keiser et al. |
| 5,950,177 A | 9/1999 | Lupien et al. |
| 5,963,923 A | 10/1999 | Garber |
| 5,970,479 A | 10/1999 | Shepherd |
| 5,978,779 A | 11/1999 | Stein et al. |
| 6,012,046 A | 1/2000 | Lupien et al. |
| 6,014,627 A | 1/2000 | Togher et al. |
| 6,014,643 A | 1/2000 | Minton |
| 6,016,483 A | 1/2000 | Rickard et al. |
| 6,018,722 A | 1/2000 | Ray et al. |
| 6,021,397 A | 2/2000 | Jones et al. |
| 6,035,288 A | 3/2000 | Solomon |
| 6,076,068 A | 6/2000 | DeLapa et al. |
| 6,119,103 A | 9/2000 | Basch et al. |
| 6,195,647 B1 | 2/2001 | Martyn et al. |
| 6,199,050 B1 | 3/2001 | Alaia et al. |
| 6,230,146 B1 | 5/2001 | Alaia et al. |
| 6,247,000 B1 | 6/2001 | Hawkins et al. |
| 6,263,321 B1 | 7/2001 | Daughtery, III |
| 6,266,651 B1 | 7/2001 | Woolston |
| 6,269,346 B1 | 7/2001 | Cristofich et al. |
| 6,272,474 B1 | 8/2001 | Garcia |
| 6,278,982 B1 | 8/2001 | Korhammer et al. |
| 6,282,521 B1 | 8/2001 | Howorka |
| 6,285,989 B1 | 9/2001 | Shoham |
| 6,317,727 B1 | 11/2001 | May |
| 6,317,728 B1 | 11/2001 | Kane |
| 6,321,212 B1 | 11/2001 | Lange |
| 6,377,940 B2 | 4/2002 | Tilfors et al. |
| 6,405,180 B2 | 6/2002 | Tilfors et al. |
| 6,421,653 B1 | 7/2002 | May |
| 6,493,682 B1 | 12/2002 | Horrigan et al. |
| 6,505,174 B1 | 1/2003 | Keiser et al. |
| 6,505,175 B1 | 1/2003 | Silverman et al. |
| 6,539,362 B1 | 3/2003 | Patterson, Jr. et al. |
| 6,560,580 B1 | 5/2003 | Fraser et al. |
| 6,564,192 B1 | 5/2003 | Kinney, Jr. et al. |
| 6,601,627 B2 | 8/2003 | Kasai et al. |
| 6,618,707 B1 | 9/2003 | Katz |
| 6,647,374 B2 | 11/2003 | Kansal |
| 7,039,610 B2 | 5/2006 | Morano et al. |
| 7,047,218 B1 | 5/2006 | Wallman |
| 7,085,738 B2 | 8/2006 | Tarrant |
| 7,099,839 B2 | 8/2006 | Madoff et al. |
| 7,225,153 B2 | 5/2007 | Lange |
| 7,233,922 B2 | 6/2007 | Asher et al. |
| 7,246,093 B1 | 7/2007 | Katz |
| 7,260,554 B2 | 8/2007 | Morano et al. |
| 7,296,025 B2 | 11/2007 | Kung et al. |
| 7,333,950 B2 | 2/2008 | Shidler et al. |
| 7,389,264 B2 | 6/2008 | Kemp, II et al. |
| 7,991,670 B1 * | 8/2011 | Ebens .................. 705/36 R |
| 2002/0002530 A1 | 1/2002 | May |
| 2002/0013760 A1 | 1/2002 | Arora et al. |
| 2002/0019799 A1 | 2/2002 | Ginsberg et al. |
| 2002/0032629 A1 | 3/2002 | Siegel, Jr. et al. |
| 2002/0052816 A1 | 5/2002 | Clenaghan et al. |
| 2002/0082967 A1 | 6/2002 | Kaminsky et al. |
| 2002/0087365 A1 | 7/2002 | Kavanaugh |
| 2002/0099640 A1 | 7/2002 | Lange |
| 2002/0103738 A1 | 8/2002 | Griebel et al. |
| 2002/0128952 A1 | 9/2002 | Melkomian et al. |
| 2002/0138401 A1 | 9/2002 | Allen et al. |
| 2002/0147670 A1 | 10/2002 | Lange |
| 2002/0152152 A1 | 10/2002 | Abdelnur et al. |
| 2002/0156716 A1 | 10/2002 | Adatia |
| 2002/0156718 A1 | 10/2002 | Olsen et al. |
| 2002/0198813 A1 | 12/2002 | Patterson, Jr. et al. |
| 2003/0004858 A1 | 1/2003 | Schmitz et al. |
| 2003/0009411 A1 | 1/2003 | Ram et al. |
| 2003/0018567 A1 | 1/2003 | Flitcroft et al. |
| 2003/0018569 A1 | 1/2003 | Eisenthal et al. |
| 2003/0028462 A1 | 2/2003 | Fuhrman et al. |
| 2003/0028468 A1 | 2/2003 | Wong et al. |
| 2003/0093352 A1 | 5/2003 | Muralidhar et al. |
| 2003/0097319 A1 | 5/2003 | Moldovan et al. |
| 2003/0097325 A1 | 5/2003 | Friesen et al. |
| 2003/0115128 A1 | 6/2003 | Lange et al. |
| 2003/0139998 A1 | 7/2003 | Gilbert et al. |
| 2003/0167175 A1 | 9/2003 | Salom |
| 2003/0172026 A1 | 9/2003 | Tarrant |
| 2003/0177077 A1 | 9/2003 | Norman |
| 2003/0182220 A1 | 9/2003 | Galant |
| 2003/0208430 A1 | 11/2003 | Gershon |
| 2003/0220865 A1 | 11/2003 | Lutnick |
| 2003/0225657 A1 | 12/2003 | Whaley et al. |
| 2003/0225658 A1 | 12/2003 | Whaley |
| 2003/0236738 A1 | 12/2003 | Lange et al. |
| 2004/0019554 A1 | 1/2004 | Merold et al. |
| 2004/0024681 A1 | 2/2004 | Moore et al. |
| 2004/0030630 A1 | 2/2004 | Tilfors et al. |
| 2004/0088242 A1 | 5/2004 | Ascher et al. |
| 2004/0103050 A1 | 5/2004 | Long |
| 2004/0111358 A1 | 6/2004 | Lange et al. |
| 2004/0117284 A1 | 6/2004 | Speth |
| 2004/0133439 A1 | 7/2004 | Noetzold et al. |
| 2004/0158520 A1 | 8/2004 | Noh |
| 2004/0199450 A1 | 10/2004 | Johnston et al. |
| 2004/0215538 A1 | 10/2004 | Smith et al. |
| 2004/0236636 A1 | 11/2004 | Lutnick et al. |
| 2004/0267657 A1 | 12/2004 | Hecht |
| 2005/0027643 A1 | 2/2005 | Amaitis et al. |
| 2005/0044019 A1 | 2/2005 | Novick et al. |
| 2005/0049948 A1 | 3/2005 | Fuscone |
| 2005/0097027 A1 * | 5/2005 | Kavanaugh .................. 705/37 |
| 2005/0125326 A1 | 6/2005 | Nangalia et al. |
| 2005/0144104 A1 | 6/2005 | Kastel |
| 2005/0149428 A1 | 7/2005 | Gooch et al. |
| 2005/0165669 A1 | 7/2005 | Montanaro et al. |
| 2005/0209945 A1 | 9/2005 | Ballow et al. |
| 2005/0216384 A1 | 9/2005 | Partlow et al. |
| 2005/0267833 A1 | 12/2005 | Brodersen et al. |
| 2006/0008016 A1 | 1/2006 | Balakrishnan et al. |
| 2006/0036531 A1 | 2/2006 | Jackson et al. |
| 2006/0100949 A1 | 5/2006 | Whaley et al. |
| 2006/0106700 A1 | 5/2006 | Boren et al. |
| 2006/0106713 A1 | 5/2006 | Tilly et al. |
| 2006/0143099 A1 | 6/2006 | Partlow et al. |
| 2006/0149659 A1 | 7/2006 | Carone et al. |
| 2006/0167788 A1 | 7/2006 | Tilly et al. |
| 2006/0167789 A1 | 7/2006 | Tilly et al. |
| 2006/0253354 A1 | 11/2006 | O'Callahan |
| 2006/0253355 A1 | 11/2006 | Shalen |
| 2006/0253359 A1 | 11/2006 | O'Callahan |
| 2006/0253367 A1 | 11/2006 | O'Callahan et al. |
| 2006/0253368 A1 | 11/2006 | O'Callahan et al. |
| 2006/0253369 A1 | 11/2006 | O'Callahan |
| 2006/0253370 A1 | 11/2006 | Feuser et al. |
| 2007/0011081 A1 | 1/2007 | Bok et al. |
| 2007/0078740 A1 | 4/2007 | Landle et al. |
| 2007/0106585 A1 | 5/2007 | Miller |
| 2007/0112659 A1 | 5/2007 | Shalen et al. |
| 2007/0172352 A1 | 7/2007 | Chiang |
| 2007/0282758 A1 | 12/2007 | Vischer et al. |
| 2008/0059356 A1 | 3/2008 | Brodsky et al. |

(56) References Cited

U.S. PATENT DOCUMENTS

| | | |
|---|---|---|
| 2008/0065560 A1 | 3/2008 | Bloom |
| 2008/0120249 A1 | 5/2008 | Hiatt |
| 2008/0120250 A1 | 5/2008 | Hiatt, Jr. |
| 2008/0154790 A1* | 6/2008 | Hiatt ............................ 705/36 R |
| 2008/0183640 A1 | 7/2008 | Shalen |
| 2008/0243676 A1 | 10/2008 | Smith |

FOREIGN PATENT DOCUMENTS

| | | |
|---|---|---|
| WO | WO 00/28449 | 5/2000 |
| WO | WO 00/48053 | 8/2000 |
| WO | WO 00/57307 A1 | 9/2000 |
| WO | WO 00/70506 | 11/2000 |
| WO | WO 01/22263 | 3/2001 |
| WO | WO 01/22269 | 3/2001 |
| WO | WO 01/22313 | 3/2001 |
| WO | WO 01/22315 | 3/2001 |
| WO | WO 01/22332 | 3/2001 |
| WO | WO 01/88808 | 11/2001 |
| WO | WO 02/37396 A2 | 5/2002 |
| WO | WO 02/077766 A2 | 10/2002 |

OTHER PUBLICATIONS

PCX Plus *The Pacific Exchange*, PCX Plus Overview, Oct. 9, 2003, six pages.

The National Association of Securities Dealer, Inc. "NASD Notice to members" 00-65, Sep. 2000, 5 pages.

Special Study: Payment for Order Flow and Internalization in the Options Markets, www.sec.gov/new/studies/ordpay.htm, printed on Oct. 22, 2001, 39 pages.

Domowitz, Ian, "A taxonomy of automated trade execution systems", 12 Journal of Int'l Money and Finance, p. 607-631, dated 1993.

Evans et al. "The Effects of Electronic Trading System on Open-outcry Commodity Exchange", Social Science 410, Nov. 1998.

Wang, G. et al. "Information Transmission and Electronic Versus Open Outcry Trading Systems: An Intraday Analysis of E-Mini S&P 500 Futures, S&P 500 Index Futures and S&P 500 Cash Index", paper presented in Thailand on Dec. 3-4, 2001.

Tsang, R. "Open outcry and electronic trading in futures exchanges", Bank of Canada Review, Spring 1999, pp. 21-39.

Elind Computers Private LMTD, "Online Global Trading System for Marketplaces", brochure, 2002.

C. Danis, et al. "Alternatives to an Open Outcry Market: An Issue of Supporting Cooperation in a Competitive Situation", IBM TJ Watson Research Center, USA.

Clemens et al., "Segmentation, differentiation, and flexible pricing: Experiences with information technology and segment-tailored strategies", *Journal of Management Information Systems: JMIS*, vol. 11, No. 2, pp. 9-36, Fall 1994.

"Squeezing the poor", *Guardian*, p. 8, Feb. 11, 1997.

"La libre competencia sacude a las electricas", *Actualidad Economica*, p. 18, Sep. 30, 1996.

Souter, Gavin, "Bermuda's reinsurers eager to please", *Business Insurance*, vol. 28, No. 44, p. 77, Oct. 31, 1994.

"The Electronic Component", The Options Institute Online Learning Center, obtained at the internet address: http://www.cboe.com/LearnCenter/cboeeducation/Course_02_02/mod_02_03.html.

E. Clemons et al., "Information Technology and Screen-Based Securities Trading: Pricing the Stock and Pricing the Trade", *Management Science*, vol. 43, No. 12, Dec. 1997.

"The Pandora's Box over autoquotes; Industry Trend or Event", *Wall Street & Technology*, Section No. 3, vol. 13, p. 38; ISSN: 1060-989X, Mar. 1997.

"How is a Trade Executed—Limit Order", *Nasdaq*, dated Mar. 7, 2000, One Page.

S. Cosgrove, "Courting Retail, Institutional Customers, CBOE, AMEX Get Creative", *Knight-Ridder Financial News*, Jan. 29, 1993.

Self-Regulatory Organizations: Proposed Rule Change by the Cincinnati Stock Exchange Relating to Small Order Execution Guaranty, 1985 WL 547562; SEC Release No. 22330, Aug. 15, 1985.

A Monitoring Report on the Operation of the Cincinnati Stock Exchange National Securities Trading System, U.S. Securities and Exchanges Commission, May 1981.

A Report on the Operation of the Cincinnati Stock Exchange National Securities Trading System 1978-1981, U.S. Securities and Exchange Commission, Sep. 1982.

CBOT Press Release Entitled "Impressive Project Areg. Provides Extended Opportunity in CBOT Financial Complex", dated Jan. 1995, printed from the Internet at http://web.archive.org/web/19990429192354/finance/wat.ch/SCF0A/bulletin/_0001960.htm on Oct. 31, 2005, 3 pages.

A. Frino et al., Price and Time-Priority Versus Pro-Rata Algorithms in Electronically Traded Futures Markets: Simulation Based Performance Characteristics, Oct. 3, 1998, http://www.sirca.org.au/research/database.html (Document 1998009.pdf).

A. Frino et al., The Liquidity of Automated Exchanges: New Evidence From Germany Bund Futures, vol. 8, Journal of International Financial Markets, Institutions and Money, pp. 225-241 (1998).

Self-Regulatory Organization; Chicago Stock Exchange, Inc.; Order Approving Proposed Rule Change Creating the Chicago Match System (59 F.R. 63141) SEC Release No. 34-35030, 1994 SEC LEXIS 3863, Nov. 30, 1994.

A. Sarker et al., "Electronic Trading on Futures Exchanges," Current Issues in Economics and Finance, Federal Reserve Bank of New York, vol. 4, No. 1, Jan. 1998.

Self-Regulatory Organization; Order Approving Proposed Rule Change and Notice of Filing in Order Granting Accelerated Approval of Amendment No. 2 to the Proposed Rule Change by the Philadelphia Stock Exchange, Inc. Relating to Enhanced Specialist Participation in Parity Options Trades, SEC Release No. 34-35429, 60 F.R. 12802, Mar. 8, 1995.

CBOE Rules, CCH (1989) (Rules 6.45-8.80).

CBOE Information Circular IC 93-88 (Nov. 18, 1993).

U.S. Congress, Office of Technology Assessment, "Electronic Bulls and Bears: U.S. Securities Markets and Information Technology", OTA-CIT-469 (Washington, DC: U.S. Government Printing Office, Sep. 1990). (selected excerpts).

Self-Regulatory Organizations; Filing and Order Granting Accelerated Approval of Proposed Rule Change by the Chicago Board Options Exchange, Inc., Relating to System Modifications to the Retail Automated Execution System, SEC Release No. 34-32879, vol. 58, No. 182, Sep. 22, 1993, 49342-49343.

CBOE Regulatory Circular RG 91-71, Dec. 25, 1991.

Notice of Receipt of Plan Filed Pursuant to Section 11A(a)(3)(B) of the Securities Exchange Act of 1934, 1980 WL 29398, SEC Release No. 34-16519, Jan. 22, 1980, 7 pages.

New York Stock Exchange Constitution and Rules (Commerce Clearing House, Inc. New York Stock Exchange Guide) Jul. 15, 1965, pp. 2644-2645; 2682-2683.

R. Teweles et al., The Stock Market, Fifth Edition, John Wiley & Sons, 1987, pp. 176-181.

J. Meeker, The Work of the Stock Exchange, The Ronald Press Company 1923, pp. 108-109.

CBOE Information Circular IC91-15, Feb. 25, 1991.

"smartRay.com Delivers Stock Quotes and Financial Information to Wireless Devices for Free !", PR Newswire, p. 2870, Dec. 16, 1999.

Glen, Jack D., "Trading and information systems in two emerging stock markets", East Asian Executive Reports, vol. 16, No. 12, pp. 8, 14, Dec. 15, 1994.

Michaels, Jenna, "NASD'S Global Fumble", All Street & Technology, vol. 9 No. 11, pp. 5762, Jul. 1992.

"PHLX Files Rule Changes to Improve Handling Orders on Pace", Securities Week, p. 5, Jul. 17, 1989.

"NYSE Votes to Restrict Computerized Trading", San Jose Mercury News, Feb. 5, 1988.

SEC Notice, Release No. 34-47959, SR-CBOE-2002-05, Federal Register vol. 68, No. 110, dated Monday, Jun. 9, 2003, pp. 34441-34448.

Original Rule Filing and Amendment No. 1 to SR-CBOE-2002-05, Submitted to SEC on Jan. 16, 2002, 17 pages.

Amendment No. 2 to SR-CBOE-2002-05, Submitted to SEC on May 16, 2002, 21 pages.

(56) References Cited

OTHER PUBLICATIONS

Amendment No. 3 to SR-CBOE-2002-05, Submitted to SEC on Jan. 15, 2003, 69 pages.
Amendment No. 4 to SR-CBOE-2002-05, Submitted to SEC on Apr. 3, 2003, 71 pages.
Amendment No. 5 to SR-CBOE-2002-05, Submitted to SEC on May 15, 2003, 3 pages.
Amendment No. 6 to SR-CBOE-2002-05, Submitted to SEC on May 30, 2003, 28 pages.
SEC Notice, Release No. 34-39086, SR-PCX-97-18, Federal Register vol. 62, No. 185, dated Wednesday, Sep. 24, 1997, pp. 50036-50048.
Angel, James J., "How Best to Supply Liquidity to a Small-Capitalization Securities Market", Georgetown University, Jul. 15, 1996, 27 pages.
SEC Notice, Release No. 34-47676, SR-CBOE-2002-05, Federal Register vol. 68 No. 77, dated Tuesday, Apr. 22, 2003, pp. 19865-19874.
Co-Pending U.S. Appl. No. 60/986,727, filed Nov. 9, 2007.
SEC Notice, Release No. 34-46803, SR-PCX-2002-36, Federal Register vol. 67 No. 222, dated Monday, Nov. 18, 2002, pp. 69580-69592.
Raithel, Tom, article titled "Major Changes Seen for Exchanges", *Evansville Courier and Press,* Apr. 12, 2000, p. B.6.
Demeterfi, Kresimir, et al., "More Than You Ever Wanted to Know About Volatility Swaps," Goldman Sachs Quantitative Strategies Research Notes, Mar. 1999.
CBOE Futures Exchange letter dated May 17, 2004, to Commodity Futures Trading Commission with accompanying pages containing rules, terms, and conditions for a new product to be traded on the CBOE Futures Exchange, 8 pages.
Press Release article, "CBOE Announces Launch of Futures on VIX: First Tradable Volatility Product Will be Offered on New CBOE Futures Exchange," Sep. 5, 2003, two pages.
Sulima, Cheryl, "Volatility and Variance Swaps", *Capital Markets News,* Federal Reserve Bank of Chicago, Mar. 2001.
Transitions 1-3, *Transitions Trading* website, retrieved using: www.archive.org Jul. 29, 2004 and Dec. 11, 2004.
Bounds for A Volume Weighted Average Price Option, A. W. Stace, Sep. 24, 2004.
Hull, J. and White, A., "The Valuation of Credit Default Swap Options", *Journal of Derivatives,* vol. 10, No. 3, 2003, p. 40.
Duffie, D. and Huang, M., "Swap Rates and Credit Quality", Mar. 31, 1995.
Blahnik, Mike, "Internet Opens Up Trading Frontiers", Star Tribune, Metro Edition, Minneapolis, MN, Retrieved from: http://web.archive.org/web/20040322223904/http://www.intrade.com/, dated Jul. 25, 2004.
Bogomolny, Laura,: Wanna Make a Bet?, Canadian Business, Toronto, vol. 77, Iss. 21, Oct. 25 to Nov. 7, 2004.
Sodergreen, John, "Product profile: Economic Derivatives in the Energy Sector", *Futures Industry Magazine,* Jan.-Feb. 2005 issue, retrieved from http://www.futuresindustry/org/fi-magazine-home.asp?v=p&q=1018 on May 20, 2008.
Whaley, Robert. "Return and Rick of CBOE Buy Write Monthly Index", *The Journal of Derivatives,* 2002, pp. 35-42.
Chicago Board of Options Exchange, Inc. Description of the CBOE S & P 500 BuyWrite Index (BXM$^{SM}$), 5 pages, 2004.
Morgan Stanley, "Global Medium-Term Notes, series F", Registration statement No. 333-117752, Securities Commission and Exchange, 2004, pp. 22-26.
Chicago Board of Options Exchange, Inc. The New CBOE Volatility Index, 19 pages, 2003.
Vasiliki D. Skintzi, "Implied correlation index: A new measure of diversification", The Journal of Future Markets, Feb. 2005, vol. 25, Iss. 2, pp. 1-3.
U.S. Appl. No. 11/849,835, filed Sep. 4, 2007, entitled "System and Method for Creating and Trading a Derivative Investment Instrument Over a Range of Index Values", Applicant: O'Connell et al.
U.S. Appl. No. 12/112,605, filed Apr. 30, 2008, entitled "System and Method for Creating and Trading a Derivative Investment Instrument Over a Range of Index Values", Applicant: O'Connell et al.

* cited by examiner

METHOD AND SYSTEM FOR CREATING A VOLATILITY BENCHMARK INDEX

RELATED APPLICATIONS

The present application is a continuation of U.S. patent application Ser. No. 12/267,013, filed Nov. 7, 2008, now U.S. Pat. No. 8,249,972, which claims the benefit of U.S. Patent Application Ser. No. 60/986,718 filed Nov. 9, 2007, wherein the entirety of each of the aforementioned applications is hereby incorporated by reference.

TECHNICAL FIELD

The present invention relates generally to financial trading systems and more particularly to the generation, identification, processing, trading, quotation, and valuation of volatility benchmark indices and related derivative investment instruments.

BACKGROUND

An index is a statistical composite that is used to indicate the performance of a market or a market sector over various time periods. Examples of indices that are used to gauge the performance of stocks and other securities in the United States include the Dow Jones Industrial Average, the National Association of Securities Dealers Automated Quotations (NASDAQ) Composite Index, the New York Stock Exchange Composite Index, etc. In general, the Dow Jones Industrial Average contains thirty (30) stocks that trade on the New York Stock Exchange as well as NASDAQ, and is a general indicator of how shares of the largest United States companies are trading. The NASDAQ Composite Index is a composite index of more than three thousand (3,000) companies listed on the NASDAQ (also referred to as over-the-counter or OTC stocks). It is designed to indicate the stock performance of small-cap and technology stocks. Finally, the New York Stock Exchange Composite Index is a composite index of shares listed on the New York Stock Exchange.

In equal-dollar weighted indices, the weights of each component are reset to equal values at regular intervals, such as for example, every quarter. Between re-adjustments, the weights of the various index components will deviate from the equal-dollar weighting values as the values of the components fluctuate. Periodically, indices must be adjusted in order to reflect changes in the component companies comprising the index, or to maintain the original intent of the index in view of changing conditions in the market. For example, if a component stock's weight drops below an arbitrary threshold, or if a component company significantly alters its line of business or is taken over by another company so that it no longer represents the type of company which the index is intended to track, the index may no longer be influenced by, or reflect the aspects of the market for which it was originally designed. In such cases it may be necessary to replace a component stock with a suitable replacement stock. If a suitable replacement that preserves the basic character of the index cannot be found, the stock may simply be dropped without adding a replacement. Conversely, activity in the market for which an index is created may dictate that a new stock (which was not originally included in the index) having a strong impact in the market be added to the index to adequately reflect the market without eliminating other components. In each case, the divisor may be adjusted so that the index remains at the same level immediately after the new stock is added or the old stock is eliminated.

Derivatives are financial securities whose values are derived in part from a value or characteristic of some other underlying asset or variable (the underlying asset). The underlying asset may include securities such as stocks, market indicators and indices, interest rate, and corporate debt, such as bonds, to name but a few. Two common forms of derivatives are options contracts and futures contracts, discussed herein below.

An option is a contract giving the holder of the option the right, but not the obligation, to buy or sell an underlying asset at a specific price on or before a certain date. Generally, a party who purchases an option is said to have taken a long position with respect to the option. The party who sells the option is said to have taken a short position. There are generally two types of options: calls and puts. An investor who has taken a long position in a call option has bought the right to purchase the underlying asset at a specific price, known as the "strike price." If the long investor chooses to exercise the call option, the long investor pays the strike price to the short investor, and the short investor is obligated to deliver the underlying asset.

Alternatively, an investor who has taken a long position in a put option receives the right, but not the obligation to sell the underlying asset at a specified price, again referred to as the strike price on or before a specified date. If the long investor chooses to exercise the put option, the short investor is obligated to purchase the underlying asset from the long investor at the agreed upon strike price. The long investor must then deliver the underlying asset to the short investor. Thus, the traditional settlement process for option contracts involves the transfer of funds from the purchaser of the underlying asset to the seller, and the transfer of the underlying asset from the seller of the underlying asset to the purchaser. Cash settlement, however, is more common. Cash settlement allows options contracts to be settled without actually transferring the underlying asset.

A call option is "in-the-money" when the price or value of the underlying asset rises above the strike price of the option. A put option is "in-the-money" when the price or value of the underlying asset falls below the strike price of the option. An at-the-money option wherein the price or value of the underlying asset is equal to the strike price of the option. A call option is out-of-the-money when the price or value of the underlying asset is below the strike price. A put option is out-of-the-money when the price or value of the underlying asset is above the strike price. If an option expires at-the-money or out-of-the-money, it has no value. The short investor retains the amount paid by the long investor (the option price) and pays nothing to the long investor. Cash settlement of an in-the-money option, be it a call or a put, however, requires the short investor to pay to the long investor the difference between the strike price and the current market value of the underlying asset.

Cash settlement allows options to be based on more abstract underlying "assets" such as market indicators, stock indices, interest rates, futures contracts and other derivatives. For example, an investor may take a long position in a market index call option. In this case, the long investor receives the right to "purchase" not the index itself, but rather a cash amount equal to the value of the index (typically multiplied by a multiplier) at a specified strike value. An index call option is in-the-money when the value of the index rises above the strike value. When the holder of an in-the-money index call option exercises the option, the short investor on the opposite side of the contract is obligated to pay the long investor the difference between the current value of the index and the strike price, usually multiplied by the multiplier. If the current value of the index is less than or equal to the strike value, the option has no value. An index put option works in the same way but in reverse, having value, or being in-the-money when the value of the index falls below the strike value.

Futures contracts are another common derivative security. In a futures contract a buyer purchases the right to receive delivery of an underlying commodity or asset on a specified date in the future. Conversely, a seller agrees to deliver the commodity or asset to an agreed location on the specified date. Futures contracts originally developed in the trade of agricultural commodities, but quickly spread to other commodities as well. Because futures contracts establish a price for the underlying commodity in advance of the date on which the commodity must be delivered, subsequent changes in the price of the underlying asset will inure to the benefit of one party and to the detriment of the other. If the price rises above the futures price, the seller is obligated to deliver the commodity at the lower agreed upon price. The buyer may then resell the received product at the higher market price to realize a profit. The seller in effect loses the difference between the futures contract price and the market price on the date the goods are delivered. Conversely if the price of the underlying commodity falls below the futures price, the seller can obtain the commodity at the lower market price for delivery to the buyer while retaining the higher futures price. In this case the seller realizes a profit in the amount of the difference between the current market price on the delivery date and the futures contract price. The buyer sees an equivalent loss. Like options contracts, futures contracts may be settled in cash. Rather than actually delivering the underlying asset, cash settlement merely requires payment of the difference between the market price of the underlying commodity or asset on the delivery date and the futures contract price. The difference between the market price and the futures price is to be paid by the short investor to the long investor, or by the long investor to the short investor, depending on which direction the market price has moved. If the prevailing market price is higher than the contract price, the short investor must pay the difference to the long investor. If the market price has fallen, the long investor must pay the difference to the short investor.

Again, like options, cash settlement allows futures contracts to be written against more abstract underlying "assets" or "commodities," such as market indicators, stock indices, interest rates, futures contracts and other derivatives. For example, an investor may take a long position in a market index futures contract. In this case, the long investor "buys" the index at a specified futures price (i.e. a future value of the index on the "delivery" date). The index based futures contract is cash settled. One party to the contract pays the difference between the futures price and the actual value of the index (often multiplied by a specified multiplier) to the other investor depending on which direction the market has moved. If the value of the index has moved above the futures price, or futures value, the short investor pays the difference the long investor. If the value of the index has moved below the futures price, or futures value the long investor pays the difference to the short investor.

The Chicago Board Options Exchange (OBOE) introduced the OBOE Volatility Index®, VIX®, which quickly became the benchmark for stock market volatility. The VIX methodology was subsequently updated to ensure that VIX remains the premier benchmark of U.S. stock market volatility, as described in co-pending U.S. patent application Ser. No. 10/959,928, the entirety of which is hereby incorporated by reference.

Cash settlement provides great flexibility regarding the types of underlying assets that derivative investment instruments may be built around.

BRIEF SUMMARY

In order to provide for improvements on indices and derivative investment instruments, volatility benchmark index derivative investment instruments and methods for creating a volatility benchmark index are disclosed herein based on changes in the performance of periodically selling a volatility-based derivatives contract.

According to a first aspect of the disclosure, a method for creating a volatility benchmark index is provided. The method medium may include the steps of obtaining a value of a Treasury bill account less a mark-to-market value of at least one of a volatility-based future or option and calculating a value reflecting a volatility benchmark. The value reflecting a volatility benchmark is calculated according to the formula:

$$VPD_t = M_t = (1+r_{t-1})VPD_{t-1} - M_{ult}N_{last}(F_t - F_{t-1})$$

where $VPD_t$ is the VIX premium index value at date t, $M_t$ is a Treasury bill balance on date t, $r_{t-1}$ is the effective Treasury bill rate from date t−1 to date t, $N_{last}$ is a number of futures sold at a last roll date, $F_t$ is a daily settlement price of futures t, and $M_{ult}$ is a multiplier of the futures A computer readable medium containing processor executable instructions for executing the above method is also contemplated, as is a trading system incorporating the volatility benchmark calculation set forth above.

BRIEF DESCRIPTION OF THE DRAWINGS

For the purpose of facilitating an understanding of the subject matter sought to be protected, there is illustrated in the accompanying drawings an embodiment thereof, from an inspection of which, when considered in connection with the following description, the subject matter sought to be protected, its construction and operation, and many of its advantages should be readily understood and appreciated.

DETAILED DESCRIPTION

The steady growth of Chicago Board Option Exchange's (CBOE's) volatility complex provides a unique opportunity for investors intent on capturing the "volatility premium." The volatility premium is the risk premium that the market seems willing to pay to own realized or implied volatility. The prevalent conjecture among financial economists is that the volatility premium is explained by the negative correlation between S&P 500 volatility and S&P 500 returns. The volatility premium has always been reflected in the difference between implied and realized volatility, and it now has become apparent in the historical returns of short positions in VIX and variance futures.

To benchmark the returns of short volatility strategies, OBOE has developed two different benchmarks, S&P 500 VARB-X, an index based on selling three-month realized variance futures, and the VIX Premium Index, based on selling VIX futures. To clarify the differences between the two indexes, recall that December 2007 VIX futures settle to the value of VIX on Dec. 19, 2007 while December 2007 three-month variance futures settle to the realized variance of the S&P 500 in the three-months that precede Dec. 21, 2007, when the variance futures expire. The VARB-X Index is thus short 3-month spot realized variance while the VIX Premium Index is short forward one-month implied volatility. A second and related difference is that the exposure of the VARB-X Index to volatility risk gradually decreases as each day reveals another term of the final realized variance. In contrast to this, the exposure of the VIX Premium Index to volatility is constant as VIX futures approach maturity. The VIX Premium Index is also inherently more volatile than the VARB-X Index. The VIX Premium Index therefore offers a different take on the volatility premium that more capitalized and/or less risk averse investors may like.

This index tracks the value of a portfolio that overlays a sequence of short one-month VIX futures on a money market account. The VIX futures are held until expiration and new VIX futures are then sold. The money market account decreases leverage relative to a stand-alone short position in VIX futures. To further limit risk, the number of VIX futures sold at each roll is set to preserve 75% of the initial value of the portfolio in the event that VIX futures increase by 25 points. The decision to target the maximum loss resulting from a 25 point increase in VIX futures is based on the historical frequency distribution of one-month changes in implied volatility, as proxied by VXO, a prior version of VIX. Over any one-month period between January 1986 and July 2007, VXO has increased by more than 25 points 0.34% of the time, and 0.037% if we omit the fall of 1987. In a second version of the index, the short VIX futures position is capped with long VIX calls struck 25 points higher than the VIX futures price, or calls at the closest strike below if this strike is not listed.

Historical Performance

Figure 1:
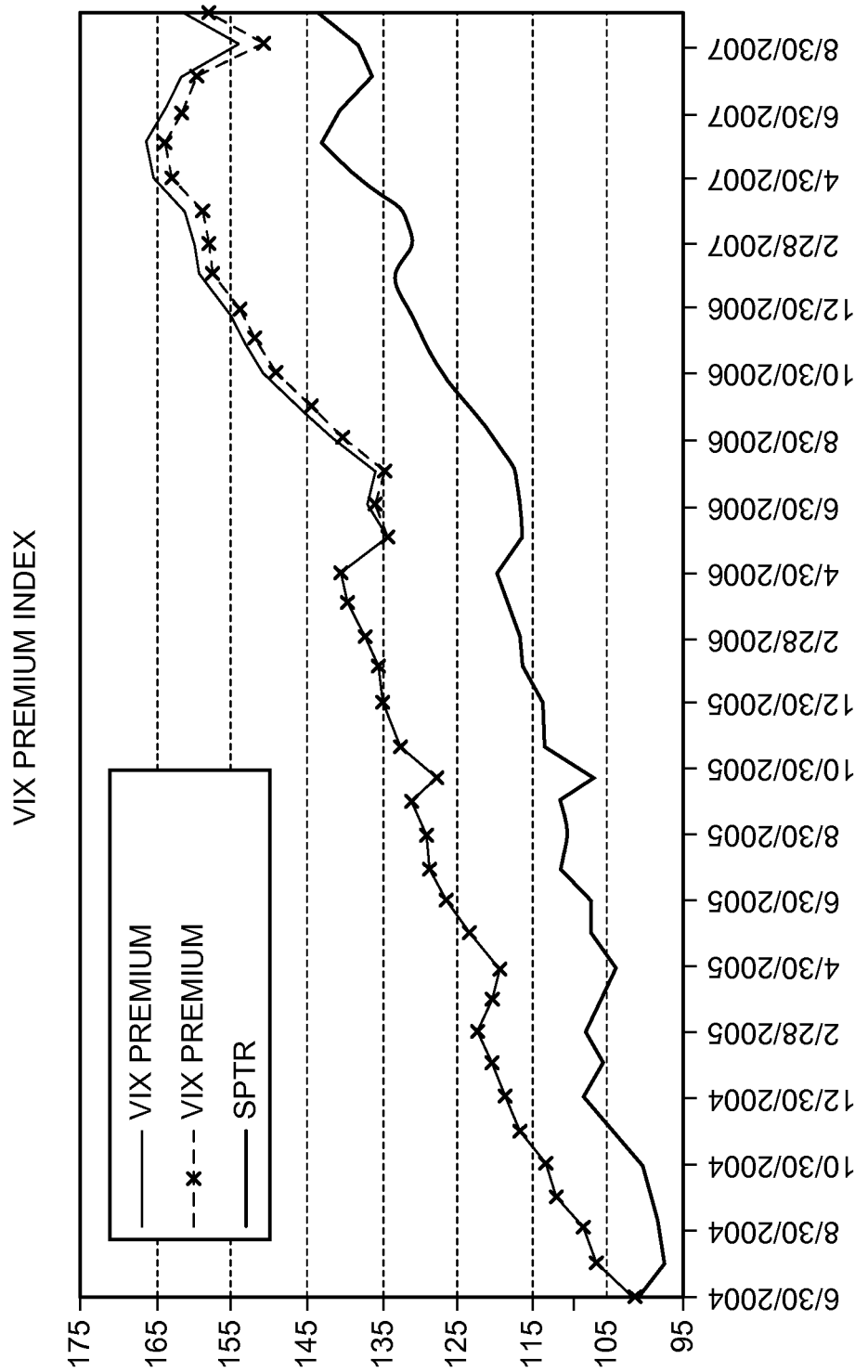
FIG. 1 is a graph illustrating one embodiment of an example volatility benchmark index that calculates a value of performance of periodically selling a volatility-based derivative investment instrument.
Figure 2:
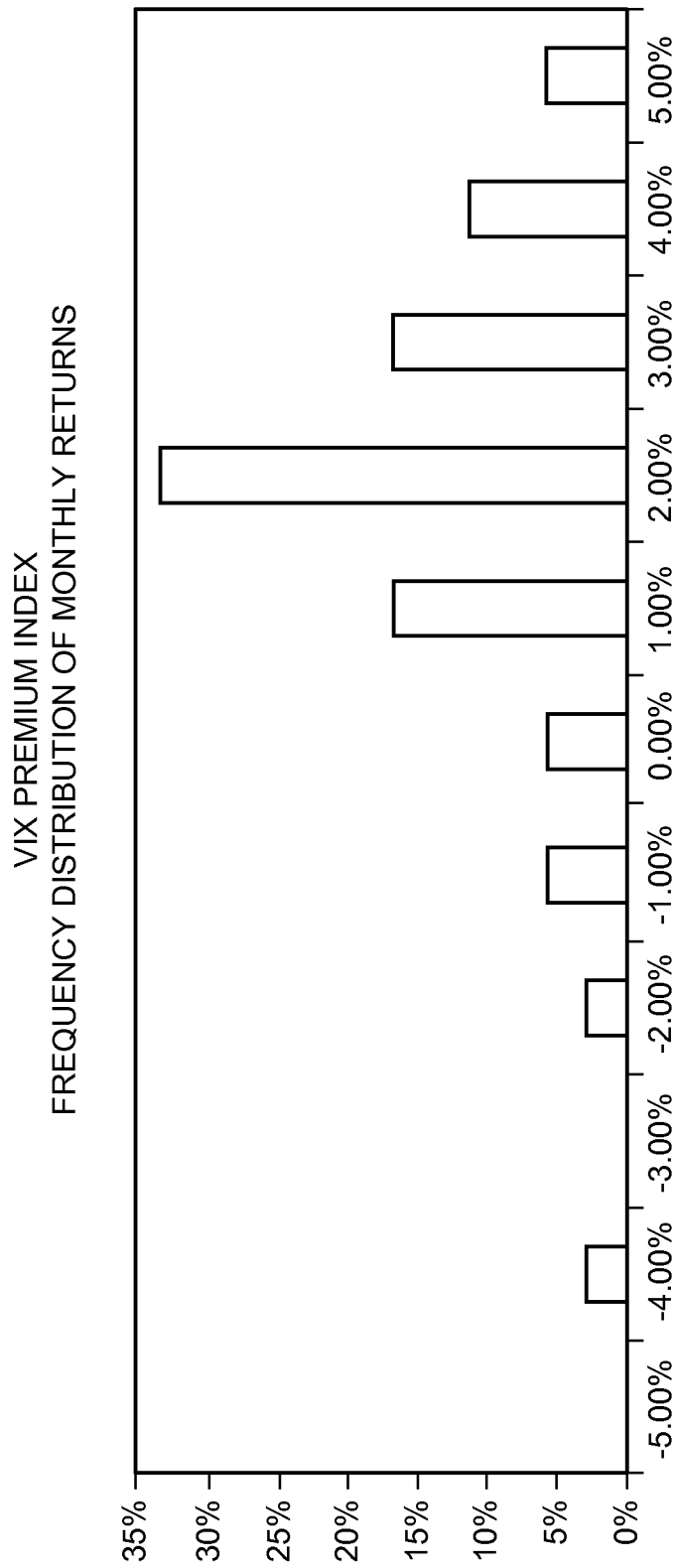
FIG. 2 is a graph illustrating a frequency of monthly returns based on the volatility benchmark index of FIG. 1.

Applying the present method to historical data ranging from June 2004 to October 2007, the VIX Premium Index increased by approximately 60% and earned an annual geometric return of 18.29% (17.68% when capped). Over the same period, the S&P 500 Total Return Index (SPTR) increased by approximately 43% and earned an annual geometric return of 12.67%. FIGS. 1 and 2 illustrate these returns using data from the June 2004 through October 2007 time period. The pronounced skew of the VIX Premium Index return suggests that the semi-standard deviation is a better proxy for risk than the standard deviation. As shown in Table 1 below, the semi-standard deviation of the VIX Premium Index was 6.64% (6.70% when capping the index), slightly smaller than the 8.16% deviation of the S&P 500. Adjusting its monthly rate of return for risk, the VIX Premium performed better than the S&P 500.

TABLE 1

| Monthly Returns March 2004- July 2007 | SPTR | VARB-X | VIX Premium 25% loss at 25 pt vol increase | VIX Premium Capped |
|---|---|---|---|---|
| Minimum Return | -3.93% | | -4.25% | -4.34% |
| Arithmetic Mean Monthly | 1.03% | | 1.44% | 1.40% |

TABLE 1-continued

| Monthly Returns March 2004- July 2007 | SPTR | VARB-X | VIX Premium 25% loss at 25 pt vol increase | VIX Premium Capped |
|---|---|---|---|---|
| Annualized Std. Deviation | 8.16% | | 6.64% | 6.70% |
| Annualized Geometric Mean | 12.67% | | 18.29% | 17.69% |
| Monthly Sharpe Ratio | 0.31 | | 0.59 | 0.56 |
| Monthly Semi-Sharpe Ratio | 0.14 | | 0.20 | 0.19 |
| Skew | -0.20 | | -0.77 | -0.76 |

Construction of VIX Premium Capped Index

The VIX Premium Index represents the value of an initial investment of $100 in a portfolio that passively follows the VIX Premium capped strategy. The uncapped strategy is identical except that no calls are bought. The portfolio may be managed and calculated as in the following example:

At the close of Jun. 15, 2006, the inception date, $100 is invested at the three-month Treasury bill rate. The intra-day cash from settling futures at the open is deemed to be invested at the close of the roll date. Similarly, settlement losses are deemed to be financed at the close. On Jun. 16, 2007, the first roll date, VIX futures are sold at the opening bid price of VIX futures and an equal number of VIX calls are bought at a strike price 25 points greater than the opening bid price of VIX futures. If this strike price is not listed, the calls are bought at the closest strike below. From thereon, the futures and options are marked-to-market daily at the close and the resulting cash flow is credited to or debited from the opening money market balance.

At the next expiration, the futures and option positions are settled at the open to their final settlement price, new VIX futures are sold at the opening bid price and new VIX calls are bought at the opening ask price. The cash flows from the final mark of expiring contracts and from the daily closing marks of the new contracts are financed from the money market balance.

This process is repeated from expiration to expiration. During the first two years of VIX futures, new contracts expiring in the next month were not listed on several occasions. The index was then calculated using a position in the second month.

Final Settlement Price of Expiring VIX Futures

At expiration, VIX futures and options are settled to a Special Opening Quotation of VIX. The SOQ is a special calculation of VIX compiled from the opening prices of 500 options.

Example Index Calculation 1

VIX Premium Index

CBOE's proposed index calculation will calculate VIX Premium Index once per day at the close of trading. On any given date, the index represents the mark-to-market value of the initial $100 invested in the VIX Premium Strategy.

At the close of every business date, the value of the VIX Premium Index is equal to the value of the Treasury bill account less the mark-to-market value of the VIX futures and calls:

$$VPI_t = M_t - 1000 N_{last}(F_t - F_{t-1}) + 1000 N_{last}(C_t - C_{t-1})$$

where $M_t$ is the Treasury bill balance on date t, $N_{last}$ is the number of futures sold and options bought at the last roll date, $F_t$ is the daily settlement price of VIX futures t, and $C_t$ is the average of the bid and ask prices of VIX calls on date t. 1000 is the multiplier of VIX future and 100 the multiplier of VIX options.

The Treasury bill balance is obtained by compounding the previous closing balance at the three-month Treasury bill rate:

$$M_t = (1+r_{t-1})VPI_{t-1}$$

where $r_{t-1}$ is the effective Treasury bill rate from date t−1 to date t.

On a roll date, $$VPI_t = M_t - 1000(N_{last}(SOQ_t - F_{t-1}] - N_{new}(F_t - F_{bid}^o)) + 100(N_{last}\text{Max}(0, SOQ_t - K) + N_{new}(C_t - C_{ask}^o))$$

where $SOQ_t$ is the final settlement price of the expiring VIX futures, $N_{new}$ is the number of new VIX futures sold and VIX calls bought, $F_{bid}^o$ is the opening bid price of VIX futures and $C_{ask}^o$ is the opening ask price of VIX calls. This balance is reinvested at the Treasury rate.

The number of new VIX futures sold and VIX calls bought on any roll date t is set such that a 25 point increase of VIX futures at the next roll still preserves 75% of initial capital.

$$N_{new} = M_t(1+R_t-0.75)/(1000*(25+(1+R_t)C_{ask}^o)$$

where $R_t$ is the effective three-month Treasury bill rate to the next roll date.

Example Calculation 2

VIX Premium Benchmark Index (VPD)

At the close of every business date, the value of the Volatility Premium Index is equal to the value of the Treasury bill account, obtained by compounding the Treasury bill balance at the previous close by the Treasury rate and netting the cash flow from marking VIX futures to market:

$$VPD_t = M_t = (1+r_{t-1})VPD_{t-1} - M_{ult}N_{last}(F_t - F_{t-1})$$

where $M_t$ is the Treasury bill balance at the close of date t, $r_{t-1}$ is the effective Treasury bill rate from date t−1 to date t, $N_{last}$ is the number of futures sold at the last roll date, $F_t$ is the daily settlement price of VIX futures t, and $M_{ult}$ is the multiplier of VIX futures (for example, 1000).

On a roll date, the cash flow from final settlement of the expiring futures and their daily mark at the close are both netted from the money market balance:

$$VPD_t = (1+r_{t-1})VPD_{t-1} - M_{ult}(SOQ_t - F_{t-1}) - N_{new}(F_t - F_{bid}))$$

where $SOQ_t$ is the final settlement price of the expiring VIX futures, $N_{new}$ is the number of new VIX futures sold, and $F_{bid}$ is the opening bid price of VIX futures. This balance is reinvested at the daily Treasury rate until the next date.

The number of new VIX futures sold at the open on a roll date t is set such that a 25 point increase of VIX futures at the next roll still preserves 75% of capital available after the final settlement of VIX futures:

$$N_{new} = M_t^o(1+R_t-0.75)/(1000*25)$$

where $M_t^o$ is the amount in the money market account at the open after the final settlement of VIX futures, and $R_t$ is the effective three-month Treasury bill rate to the next roll date.

$$M_t^o = M_{t-1} - M_{ult}N_{last}(SOQ_t - F_{t-1})$$

Example Calculation 3

Capped VIX Premium Benchmark Index (VPN)

At the close of every business date, the value of the VPD is equal to the closing value of the Treasury bill account plus the mark-to-market value of the VIX calls:

$$VPD_t = M_t + 100*10N_{last}C_t$$

where $M_t$ is the Treasury bill balance at the close of date t, $N_{last}$ is the number of futures sold and 10 $N_{last}$ is the number of VIX options bought at the last roll date, $F_t$ is the daily settlement price of VIX futures t, and $C_t$ is the average of the bid and ask quotes of the VIX calls at the close. The Treasury bill balance is obtained by compounding the previous closing Treasury balance at the three-month Treasury bill rate and netting the cash flow from the mark of VIX futures:

$$M_t = (1+r_{t-1})M_{t-1} - M_{ult}N_{last}(F_t - F_{t-1})$$

$$M_{t-1} = VPD_{t-1} - M_{ult}N_{last}C_t$$

where $r_{t-1}$ is the effective Treasury bill rate from date t−1 to date t.

At the close of a roll date, as on regular days, the index is equal to the closing Treasury balance plus the mark of the new options. The closing Treasury balance is now equal to the Treasury balance at the previous close compounded by the daily Treasury rate net of the cash flows from (1) final settlements of VIX futures and options, (2) the daily mark of new VIX futures and (3) the purchase of new VIX calls.

$$VPD_t = (1+r_{t-1})M_{t-1} + M_{ult}N_{last}(\max[0, SOQ_t - K] - (SOQ_t - F_{t-1})) + M_{ult}N_{new}(C_t - C_a - (F_t - F_{bid}))$$

where $SOQ_t$ is the final settlement price of the expiring VIX futures, K is the strike of the expiring VIX calls, $N_{new}$ is the number of new VIX futures sold, $C^a$ is the ask price of the VIX calls bought at the open, $F_{bid}$ is the opening bid price of VIX futures. As on non-roll dates, the Treasury balance is reinvested at the Treasury rate.

The number of new VIX futures sold on a roll date t is set such that a 25 point increase of VIX futures at the next roll still preserves 75% of capital available after the final settlement of the VIX futures and options:

$$N_{new} = M_t^o(1+R_t-0.75)/(1000*(25+(1+R_t)C_{ask})$$

$$M_t^o = (1+r_{t-1})M_{t-1} + M_{ult}N_{last}(\max[0, SOQ_t - K] - (SOQ_t - F_{t-1}))$$

where $R_t$ is the effective three-month Treasury bill rate to the next roll date.

Figure 3:
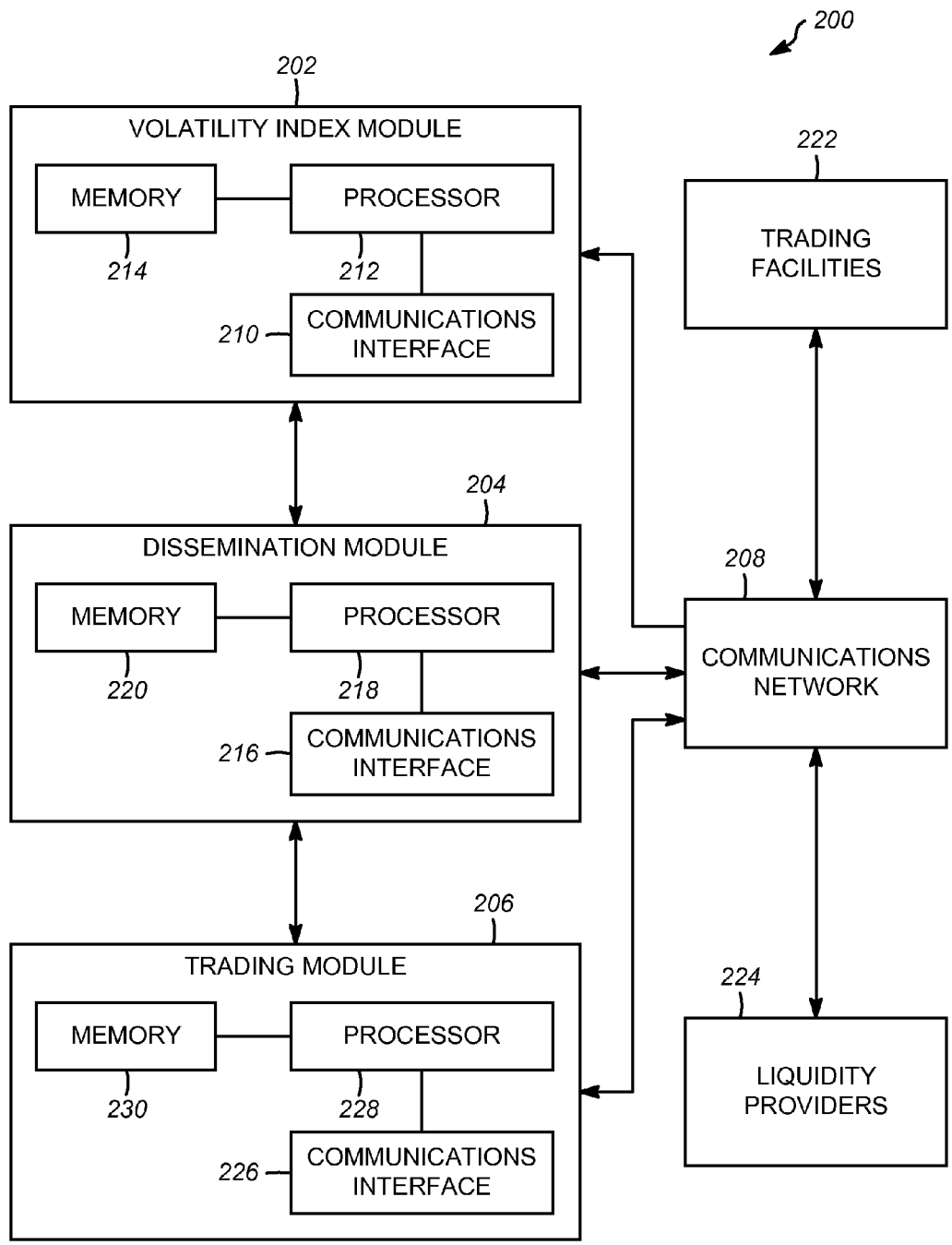
FIG. 3 is a block diagram of a system for creating and trading derivative investment instruments based on a volatility benchmark index.

FIG. 3 is a block diagram of a system 200 for creating and trading derivative investment instruments based on a volatility benchmark index. Generally, the system comprises a volatility benchmark index module 202, a dissemination module 204 coupled with the volatility benchmark index module 202, and a trading module 206 coupled with the dissemination module 204. Typically, each module 202, 204, 206 is also coupled to a communication network 208 coupled to various trading facilities 222 and liquidity providers 224.

The volatility benchmark index module 202 comprises a communications interface 210, a processor 212 coupled with the communications interface 210, and a memory 214 coupled with the processor 212. Logic stored in the memory 214 is executed by the processor 212 such that that the volatility benchmark index module 202 may receive a first set of trade information for each underlying asset representative of a desired group of underlying assets through the communications interface 210, aggregate that first set of trade information over a first time period, calculate a volatility benchmark index for the desired group of underlying assets with the aggregated first set of trade information, and a standardized measure of the index; and pass the calculated values to the dissemination module 204.

The dissemination module 204 comprises a communications interface 216, a processor 218 coupled with the communications interface 216, and a memory 220 coupled with the processor 218. Logic stored in the memory 220 is executed by the processor 218 such that the dissemination module 204 may receive the calculated values from the volatility benchmark index module 202 through the communications interface 216, and disseminate the calculated values over the communications network 208 to various market participants 222.

The trading module 206 comprises a communications interface 226, a processor 228 coupled with the communications interface 226, and a memory 230 coupled with the processor 228. Logic stored in the memory 230 is executed by the processor 228 such that the trading module 206 may receive buy or sell orders over the communications network 208, as described above, and pass the results of the buy or sell order to the dissemination module 204 to be disseminated over the communications network 208 to the market participants 222.

Figure 4:
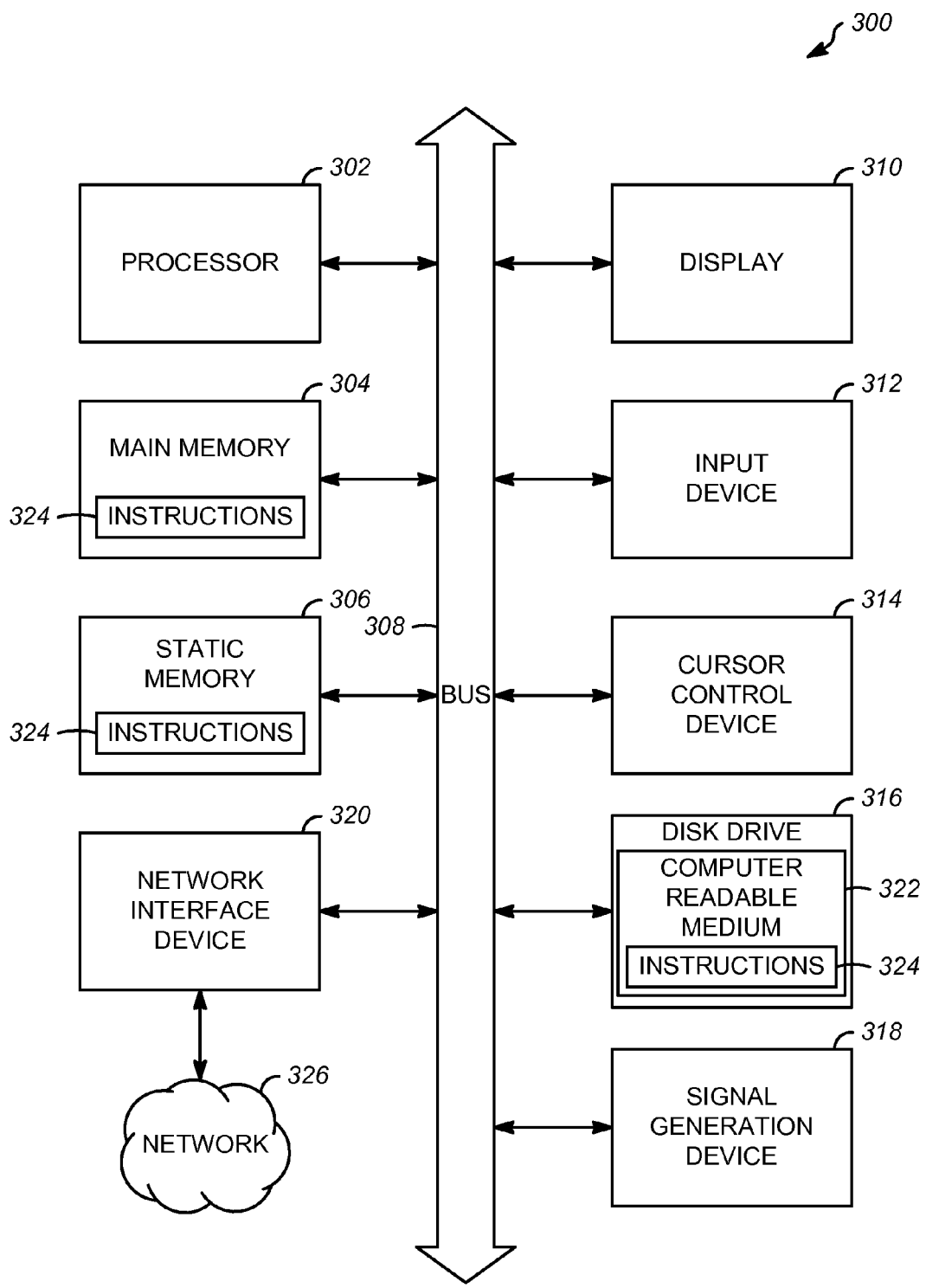
FIG. 4 a general computer system that may be used for one or more of the components shown in FIG. 3.

Referring to FIG. 4, an illustrative embodiment of a general computer system that may be used for one or more of the components shown in FIG. 3, or in any other trading system configured to carry out the methods discussed above, is shown and is designated 300. The computer system 300 can include a set of instructions that can be executed to cause the computer system 300 to perform any one or more of the methods or computer based functions disclosed herein. The computer system 300 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 300 can also be implemented as or incorporated into various devices, such as a personal computer (PC), a tablet PC, a set-top box (STB), a personal digital assistant (PDA), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 300 can be implemented using electronic devices that provide voice, video or data communication. Further, while a single computer system 300 is illustrated, the term "system" shall also be taken to include any collection of systems or sub-systems that individually or jointly execute a set, or multiple sets, of instructions to perform one or more computer functions.

As illustrated in FIG. 4, the computer system 300 may include a processor 302, e.g., a central processing unit (CPU), a graphics processing unit (GPU), or both. Moreover, the computer system 300 can include a main memory 304 and a static memory 306 that can communicate with each other via a bus 308. As shown, the computer system 300 may further include a video display unit 310, such as a liquid crystal display (LCD), an organic light emitting diode (OLED), a flat panel display, a solid state display, or a cathode ray tube (CRT). Additionally, the computer system 300 may include an input device 312, such as a keyboard, and a cursor control device 314, such as a mouse. The computer system 300 can also include a disk drive unit 316, a signal generation device 318, such as a speaker or remote control, and a network interface device 320.

In a particular embodiment, as depicted in FIG. 4, the disk drive unit 316 may include a computer-readable medium 322 in which one or more sets of instructions 324, e.g. software, can be embedded. Further, the instructions 324 may embody one or more of the methods or logic as described herein. In a particular embodiment, the instructions 324 may reside completely, or at least partially, within the main memory 304, the static memory 306, and/or within the processor 302 during execution by the computer system 300. The main memory 304 and the processor 302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 324 or receives and executes instructions 324 responsive to a propagated signal, so that a device connected to a network 326 can communicate voice, video or data over the network 326. Further, the instructions 324 may be transmitted or received over the network 326 via the network interface device 320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used on financial exchanges, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

As will be appreciated by those of ordinary skill in the art, mechanisms for creating a volatility benchmark index, derivative investment instruments based thereon and other features described above may all be modified for application to other derivative investment instruments, such as futures and options, within the purview and scope of the present invention. An advantage of the disclosed methods and derivative investment instruments is that more traders at the exchange may have more opportunity to trade new products and obtain new and valuable market information, thus increasing visibility of orders and the desirability of maintaining a presence at the exchange.

The matter set forth in the foregoing description, accompanying drawings and claims is offered by way of illustration only and not as a limitation. While particular embodiments have been shown and described, it will be apparent to those skilled in the art that changes and modifications may be made without departing from the broader aspects of applicants' contribution. It is therefore intended that the foregoing detailed description be regarded as illustrative rather than limiting, and that it be understood that it is the following claims, including all equivalents, that are intended to define the scope of this invention.

What is claimed is:

1. A non-transitory computer-readable medium containing processor executable program instructions for creating a volatility benchmark index, the instructions configured for causing a processor to execute the steps of:
storing a value of a Treasury bill account less a mark-to-market value of at least one of a volatility-based future or option in a memory;
calculating a value reflecting a volatility benchmark on the processor based on the stored value; and
wherein the value reflecting a volatility benchmark is calculated according to the formula:

$$VPD_t = M_t = (1+r_{t-1})VPD_{t-1} - M_{ult}N_{last}(F_t - F_{t-1})$$

where $VPD_t$ is a VIX premium index value at date t, $M_t$ is a Treasury bill balance on date t, $r_{t-1}$ is an effective Treasury bill rate from date t−1 to date t, $N_{last}$ is a number of futures sold at a last roll date, $F_t$ is a daily settlement price of futures at date t, and $M_{ult}$ is a multiplier of the futures.

2. The non-transitory computer-readable medium of claim 1, wherein on a roll date the processor executable program instructions are configured to cause the processor to calculate $VPD_t$ according to the formula:

$$VPD_t = (1+r_{t-1})VPD_{t-1} - M_{ult}(N_{last}(SOQ_t - F_{t-1}) - N_{new}(F_t - F_{bid}))$$

where $SOQ_t$ is a final settlement price of the expiring futures, $N_{new}$ is the number of new futures and $F_{bid}$ is an opening bid price of volatility-based futures.

3. A non-transitory computer-readable medium containing processor executable program instructions for creating a volatility benchmark index, the instructions configured for causing a processor to execute the steps of:
storing a closing value of a Treasury bill account plus a mark-to-market value of at least one of a volatility-based future or option in a memory;
calculating a value reflecting a volatility benchmark on the processor based on the stored closing value; and
wherein the value reflecting a volatility benchmark is calculated according to the formula:

$$VPD_t = M_t + 100*10 N_{last}C_t$$

where $M_t$ is a Treasury bill balance at a close of date t, $N_{last}$ is a number of futures sold and $10 N_{last}$ is a number of volatility index (VIX) options bought at a last roll date, and $C_t$ is an average of bid and ask quotes of VIX calls at the close on date t.

4. The non-transitory computer-readable medium of claim 3, wherein the Treasury bill balance is calculated by compounding a previous closing Treasury balance at a three-month Treasury bill rate and netting a cash flow from VIX futures.

5. A method for creating a volatility benchmark index, the method comprising:
in a trading system having a memory and a processor in communication with the memory, the processor:
storing in the memory a value of a Treasury bill account less a mark-to-market value of at least one of a volatility-based future or option in a memory;
calculating a value reflecting a volatility benchmark on the processor based on the stored value; and
wherein the value reflecting a volatility benchmark is calculated according to the formula:

$$VPD_t = M_t = (1+r_{t-1})VPD_{t-1} - M_{ult}N_{last}(F_t - F_{t-1})$$

where $VPD_t$ is a VIX premium index value at date t, $M_t$ is a Treasury bill balance on date t, $r_{t-1}$ is an effective Treasury bill rate from date t−1 to date t, $N_{last}$ is a number of futures sold at a last roll date, $F_t$ is a daily settlement price of futures at date t, and $M_{ult}$ is a multiplier of the futures.

6. The method of claim 5, further comprising, on a roll date, the processor calculating $VPD_t$ according to the formula:

$$VPD_t = (1+r_{t-1})VPD_{t-1} - M_{ult}(N_{last}(SOQ_t - F_{t-1}) - N_{new}(F_t - F_{bid}))$$

where $SOQ_t$ is a final settlement price of the expiring futures, $N_{new}$ is the number of new futures and $F_{bid}$ is an opening bid price of volatility-based futures.

* * * * *